May 16, 1944.                J. D. CRECCA                2,348,728

METHOD OF ARC WELDING

Filed April 7, 1941

JOHN D. CRECCA
INVENTOR

BY

ATTORNEY

Patented May 16, 1944

2,348,728

UNITED STATES PATENT OFFICE 2,348,728

METHOD OF ARC WELDING

John D. Crecca, United States Navy

Application April 7, 1941, Serial No. 387,135

6 Claims. (Cl. 219—10)

(Granted under the act of March 3, 1883, as amended April 30, 1928; 370 O. G. 757)

This invention relates to a method of depositing metal from a welding rod by what is usually termed the metallic arc process.

It is the principal object of this invention to provide a method of making elongated welds, such as seam welds, and also to deposit welding rod material over an area, as where a work piece is to be built up.

In the drawing:

Fig. 2 (A) is similar to Fig. 2 but illustrates a portion of the welding rod in molten condition being transferred to the situs of the weld;

In United States Patent 2,115,707, issued jointly to Samuel S. Scott and me, there is disclosed a method of end-welding without touching the stud or bolt, that is to be end-welded, to the work piece to initiate the arc. Also, in Patent 2,138,025, issued jointly to the same parties, we claim an arc-initiating material that is suitable for making welds of the type shown in the first-mentioned patent. This arc-initiating material is made up of iron and aluminum in fine granular or filamentary particles. When the arc-initiating material is deposited at the situs of a weld or caused to adhere to the end of a piece to be welded, and the piece to be welded is spaced at proper arc length from the work piece and an electric potential impressed between the two, the arc is established without conductive contact between the two pieces.

Figure 1:
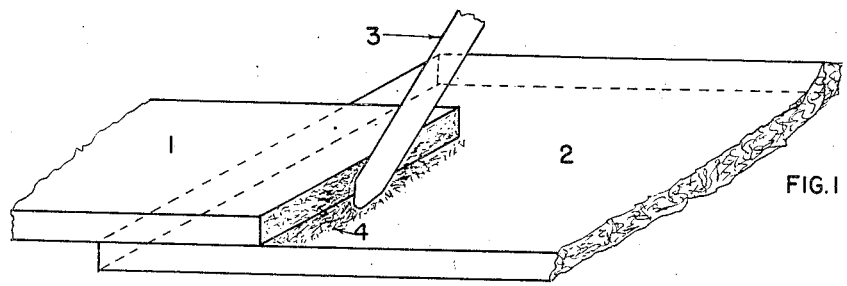
Figs. 1 and 2 are respectively a perspective plan view and a side elevational view of my invention when used for making a lap weld.
Figure 2:
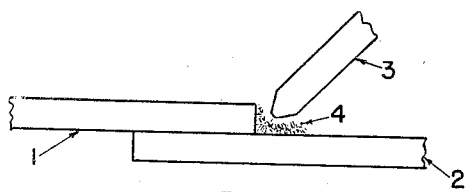
Figure 2A:
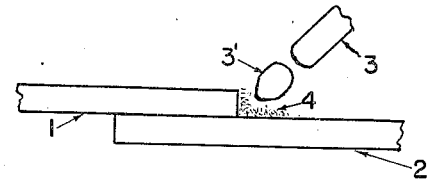
Figure 3:
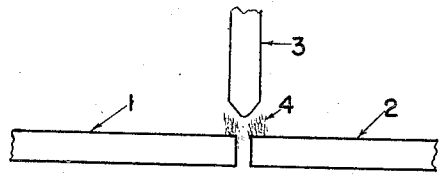
Figs. 3 and 4 are side elevational views of butt welds.

Referring now to the drawing, the reference numerals 1 and 2 designate the work pieces to be joined together. In Figs. 1, 2 and 3 the arc-initiating material 4 is deposited along the situs of the seam and the welding rod 3 is disposed with an end thereof at the proper arc length from the work pieces 1 and 2. When the welding potential is impressed between the welding rod 3 and the work pieces 1 and 2, the arc is established without contact between the welding rod and the work pieces. The material at the end of the welding rod fuses, becomes detached from the welding rod as indicated at 3' in Fig. 2(A), and is carried to and deposited upon the situs of the weld.

The welding rod is traversed along the area of the weld at sufficient rate to secure the desired deposition of welding rod metal and is simultaneously fed toward the weld at a rate to maintain the proper arc length. It is believed what actually happens is probably that after the deposition of each globule 3' of molten welding rod metal the arc is extinguished but is instantaneously re-established by the arc-initiating material. The material so deposited by the repetitive cycles may be considered as an integration of the successive cycles of striking the arc by the arc-initiating material, extinguishing of the arc and re-initiating the arc. The practical effect is the same as though the arc were continuous. However, this statement of theory is in no way to be construed as a limitation or restriction upon the scope of the present invention.

Figure 4:
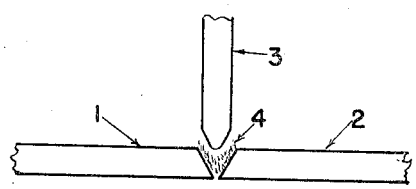

Figs. 3 and 4 show the manner of making butt welds. Here the arc-initiating material 4 is placed along the junction of the work pieces 1 and 2 and after the arc is struck the welding rod is traversed along the weld.

Figure 5:
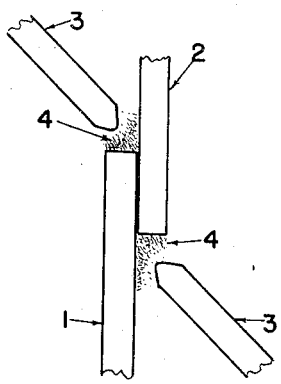
Fig. 5 depicts the manner of making a lap weld when the work pieces are vertical.
Figure 6:
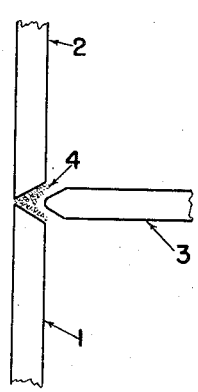
Fig. 6 is similar to Fig. 5 but the weld there being formed is a butt weld.

Fig. 5 depicts making a lap weld where the two work pieces 1 and 2 are vertical. Here the arc-initiating material 4 on the upper seam is merely laid on the work pieces, but for the lower seam the arc-initiating material 4 is mixed with some suitable substance that will cause the arc-initiating material 4 to adhere to the work pieces along the seam. Fig. 6 shows the making of a butt weld where the work pieces 1 and 2 are vertical and in this case also, it is probably more satisfactory to cause the arc-initiating material 4 to adhere to the work pieces.

Figure 7:
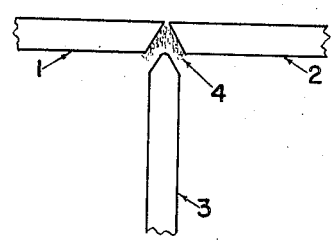
Fig. 7 depicts the manner of making a butt weld when the work pieces are overhead.

Fig. 7 illustrates making a butt weld where the pieces 1 and 2 are overhead and in this case it is obvious that the arc-initiating material 4 must be made to adhere to the work pieces.

When the arc-initiating material is to be held on the work pieces, it may be mixed with glycerine, glue, or any other suitable substance and may be troweled brushed or poured upon the situs of the weld or it may be applied by squeezing a paste of the arc-initiating material through a small opening in a cloth bag. As set forth in Patent 2,138,025 above-mentioned, the arc-initiating material may include an oxygen-scavenging substance other than aluminum.

The invention described herein may be manufactured and used by or for the Government of the United States of America for governmental purposes without the payment of any royalties thereon or therefor.

I claim:

1. A method of making a seam weld, comprising the steps of placing arc-initiating material along the situs of the weld in contact with the work to be welded, disposing a welding electrode with an end thereof at the proper arc distance from said work and adjacent said material, impressing an electric potential between said electrode and said work while said electrode is spaced from said material whereby an arc is initiated by said material while said electrode is maintained spaced from said work, moving said electrode along the situs of the weld at a rate to make the desired weld and simultaneously feeding said electrode toward said work at a rate to maintain the proper arc distance between the electrode and the work, said material functioning to reestablish the arc substantially instantaneously if it is extinguished during the welding operation.

2. A method of making a metallic arc weld, comprising placing arc-initiating material on the work to be welded on the situs of the weld, disposing a welding electrode with an end thereof at the proper arc distance from said work and adjacent said material, impressing an electric potential between said work and said electrode while said electrode is spaced from said material whereby an arc is initiated by said material while said electrode is maintained spaced from said work, moving said electrode over the situs of the weld at a rate to secure the desired deposition of welding rod metal on the work, and simultaneously feeding said electrode toward said work at a rate to maintain the proper arc length, said material functioning to reestablish the arc substantially instantaneously if it is extinguished during the welding operation.

3. A method of bonding welding rod metal to a work piece, comprising the steps of placing arc-initiating material on the area whereon the welding rod material is to be deposited, disposing a welding rod with an end thereof at the proper arc distance from said area, impressing an electric potential between said work and said rod while said electrode is spaced from said material whereby an arc is initiated while said rod is maintained at said distance from said work, moving said rod over said area at a rate to secure the desired deposition of welding rod metal, and simultaneoulsy feeding said rod toward said area to maintain the proper arc length, said material functioning to reestablish the arc substantially instantaneously if it is extinguished during the welding operation.

4. A method of bonding welding rod metal to an overhead work piece, comprising the steps of applying to particles of arc-initiating material a substance that will cause said material to adhere to said work piece, applying the said material thus treated to said work piece on the situs of the weld, disposing a welding rod with an end thereof at the proper arc distance from said situs, impressing an electric potential between said rod and said work piece while said electrode is spaced from said material whereby an arc is initiated while said rod is maintained at the said distance from the work, moving said rod over the said situs, and simultaneously feeding said rod toward said situs to maintain the proper arc length, said material functioning to reestablish the arc substantially instantaneously if it is extinguished during the welding operation.

5. A method of bonding welding rod metal to a work piece, comprising the steps of placing arc-initiating material on the area whereon the metal is to be deposited, disposing a welding rod with an end the proper arc distance from said area, impressing an electrical potential between said rod and said work piece while said electrode is spaced from said material, and moving said rod over said area while maintaining said arc distance between said rod and said area, whereby said material initiates an arc and substantially continuously and instantaneously re-establishes the arc if and when the arc is extinguished during the welding operation.

6. A method of bonding welding rod metal to a work piece, comprising the steps of applying to particles of an arc-initiating material a substance that will act as a binder for said material and cause said material to adhere to said work piece, applying the said material thus treated to said work piece on the situs of the weld, disposing a welding rod with an end thereof at the proper arc distance from said situs, impressing an electric potential between said rod and said work piece while said electrode is spaced from said material whereby an arc is initiated while said rod is maintained at the said distance from the work, moving said rod over the said situs, and simultaneously feeding said rod toward said situs to maintain the proper arc length, said material functioning to reestablish the arc substantially instantaneously if it is extinguished during the welding operation.

JOHN D. CRECCA.